March 2, 1971  P. S. LANGNESS  3,566,586
AIR CLEANER FOR INTERNAL COMBUSTION ENGINE
Filed June 9, 1969  2 Sheets-Sheet 1
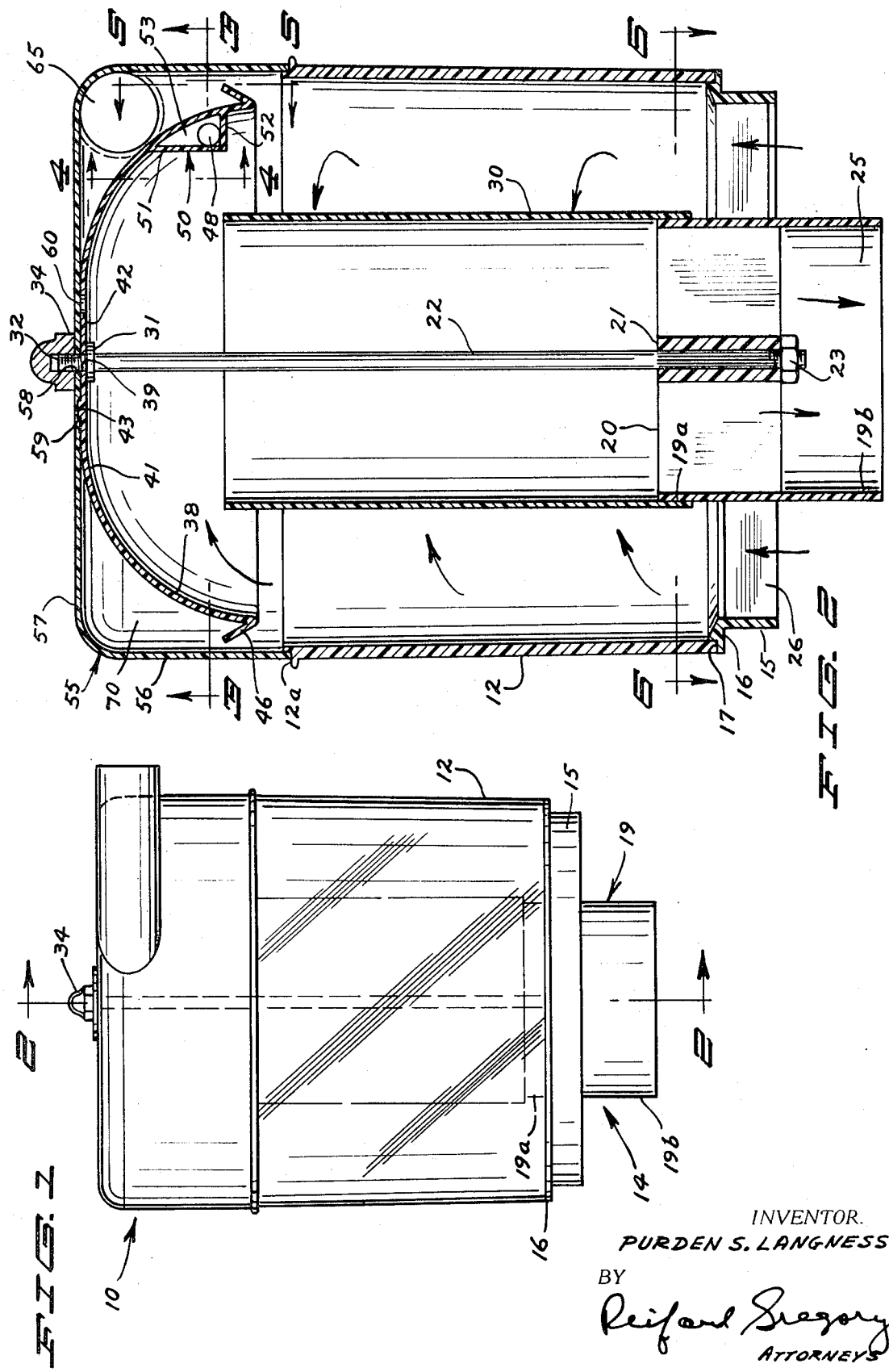
INVENTOR.
PURDEN S. LANGNESS
BY
Reifard Gregory
ATTORNEYS March 2, 1971  P. S. LANGNESS  3,566,586
AIR CLEANER FOR INTERNAL COMBUSTION ENGINE
Filed June 9, 1969  2 Sheets-Sheet 2
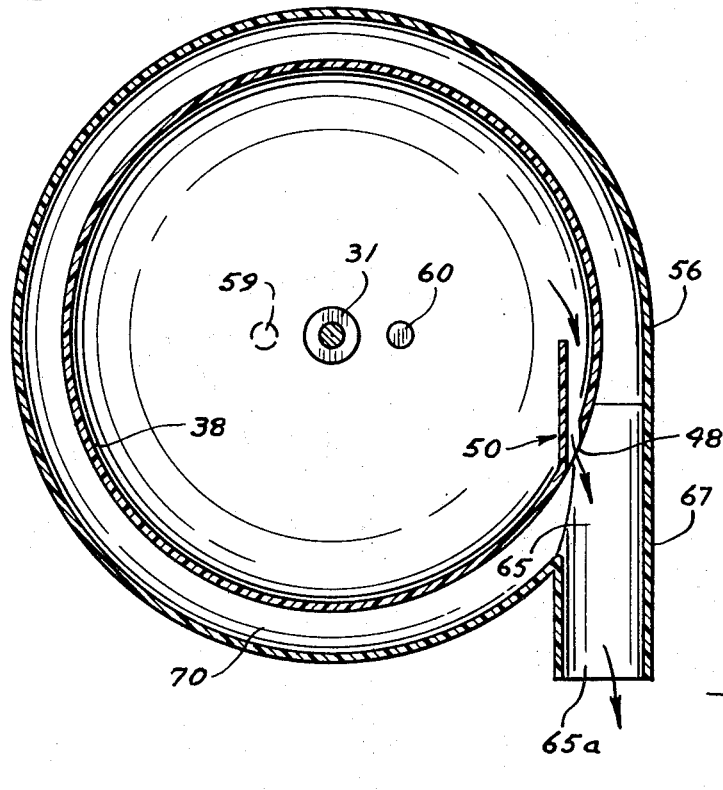
FIG. 3
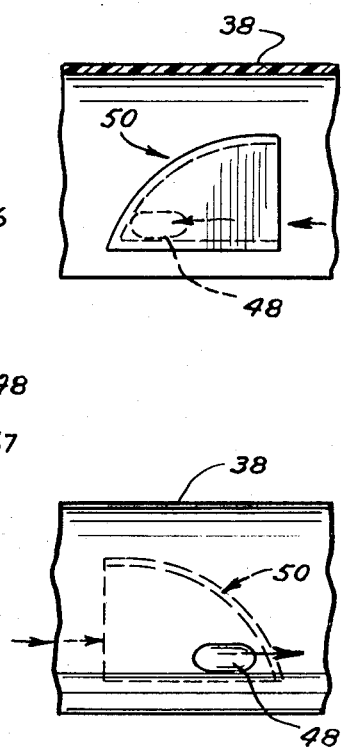
FIG. 4
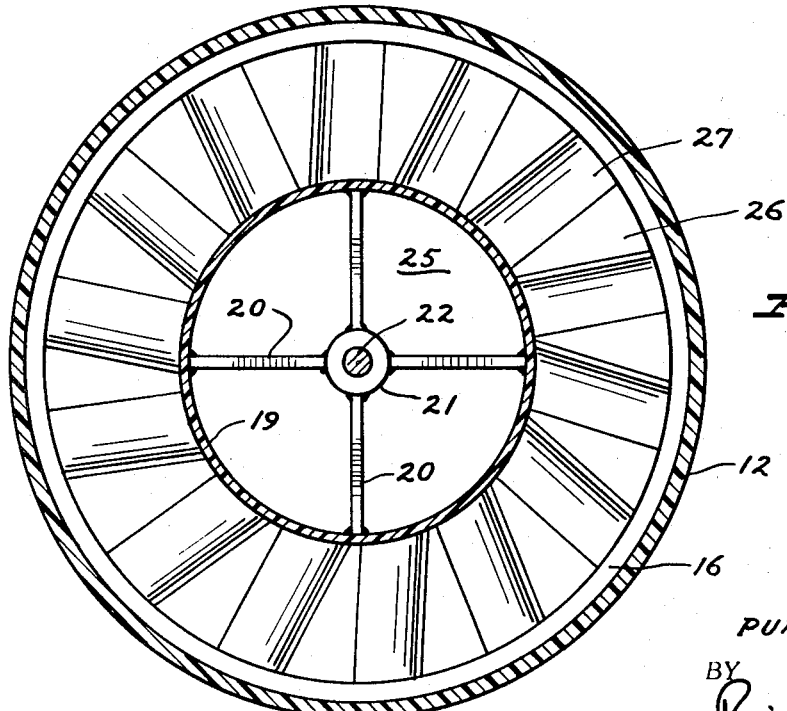
FIG. 5
FIG. 6
INVENTOR.
PURDEN S. LANGNESS
BY
ATTORNEYS United States Patent Office
3,566,586
Patented Mar. 2, 1971

3,566,586
AIR CLEANER FOR INTERNAL COMBUSTION ENGINE
Purden S. Langness, Fargo, N. Dak., assignor to Dustmaster Corporation, Harvey, N. Dak.
Filed June 9, 1969, Ser. No. 831,444
Int. Cl. B01d 45/12
U.S. Cl. 55—451      1 Claim

ABSTRACT OF THE DISCLOSURE

An air cleaner for a motor vehicle comprising a cylindrical housing having an annular louvered inlet passage and a central passage, a deflector plate overlying said central passage, a tangential outlet passage through said deflector plate adjacent its periphery, and an outlet passage in said housing cooperative with said last mentioned passage whereby contaminants in the air stream entering the annular passage are centrifuged and exhausted through said outlet passages with a result that substantially clean air is drawn through said central passage into the carburetion system of the vehicle.

BACKGROUND AND SUMMARY OF THE INVENTION

The invention herein relates to a new and useful improvement in an air cleaner for a motor vehicle which structure to effectively exhaust to the atmosphere substantially all of the contaminants removed from the air stream drawn into said cleaner whereby said air cleaner is substantially self cleaning.

Representative of related art are U.S. Pats. Nos. 2,461,395, 1,906,432, 1,762,493 and 1,734,030. The structures disclosed in said patents provide for a centrifuge principle to separate contaminants from an indrawn air stream but only the last mentioned patent provides a deflector plate to prevent contaminants from falling back into the air stream as air is drawn into the passage through which it is supplied to the carburetion system. However, in this patent the deflector plate is so arranged as to permit contaminants to accumulate therein which require manual removal.

The improvement in the structure of the invention herein provides for a continuing centrifuge action with respect to all contaminants present within the housing of the structure until they are substantially completely exhausted and not permitted to accumulate and whatever residue may be present of said contaminants is so minimal in quantity that it may be disregarded.

Generally stated, the invention herein comprises a housing having an annular passage and a central passage, air is drawn into the annular passage to have a centrifuge action whereby the air stream adjacent said central passage is made practically free of contaminants and this air is drawn into and through said central passage to the carburetion system. The air spinning about the outer periphery of said annular passage carries the contaminants which are moved upwardly to engage a deflector plate and to be exhausted through a peripheral outlet in said plate. Centrifugal action of the air continues above said reflector plate within the housing exhausting contaminants through an outlet in the housing to the atmosphere. The deflector plate is so designed that contaminants which may become deposited on its upper surface will be picked up by the air stream and exhausted to the atmosphere.

It is an object of this invention therefore to provide an air cleaner which maintains itself substantially free from accumulation of contaminants.

It is another object of this invention to provide an air cleaner which effectively removes contaminants from the portion of the air stream drawn into said air cleaner which passes to the carburetion system and prevents the re-entry of said contaminants into said portion of said air stream.

These and other objects and advantages of the invention will be set forth in the following description made in connection with the accompanying drawings in which like reference characters refer to similar parts throughout the several views and in which—

FIG. 1 is a view in elevation;
FIG. 2 is a view in vertical section of an enlarged scale taken on line 2—2 of FIG. 1 as indicated;
FIG. 3 is a view in horizontal section taken on line 3—3 of FIG. 2 as indicated;
FIG. 4 is a fragmentary view in vertical section taken on line 4—4 of FIG. 2 as indicated;
FIG. 5 is a fragmentary view in vertical section taken on line 5—5 of FIG. 2 as indicated; and
FIG. 6 is a view in horizontal section taken on line 6—6 of FIG. 3 as indicated.

DESCRIPTION OF A PREFERRED EMBODIMENT

Referring to the drawings, the subject matter of the invention herein comprising an air cleaner is indicated generally by the reference numeral 10. Said air cleaner is shown consisting of a cylindrical housing 12 here formed of a transparent plastic material. A base member 14 forms a bottom wall for said housing comprising an annular ring 15 having a projecting annular flange 16 having an annular peripheral groove 17 therein within which is seated the lower end portion of said housing, as indicated in FIG. 2.

Said annular ring has a central tubular hub portion 19 having a cross angled web portion 20 therein having a hub 21 with a rod 22 upstanding therefrom and having its lower end portion disposed in said hub as by a press fit and having a threaded portion depending therebelow to be secured by a nut 23. Said hub portion 19 has a portion 19a thereof extending upwardly and inwardly of said housing and has a depending portion 19b extending outwardly of said housing. Thus a central passage 25 is formed through said hub portion 19 and an annular passage 26 is formed between said hub portion 19 and said ring 15. Connecting said hub portion 19 and said ring 15 are a plurality of louvers or angled vanes 27, as indicated in FIG. 6. Hence air passing through said passage 26 is deflected upwardly by said louvers.

Extending upwardly of said hub portion 19 and forming an extension thereof is a tubular member 30 which here is shown secured to said hub portion as by the use of an adhesive.

Said rod 22 extends upwardly of said tubular member 30 having an integral collar 31 adjacent its upper threaded end portion 32 which will carry a lock nut 34.

Supported on said collar 31 and overlying and spaced above the upper portion of said tubular member 30 is a dome-shaped or partially spherical deflector plate 38 having a central aperture 39 through which the threaded portion of said rod extends. Said deflector plate has a central flat area 41 as indicated in FIG. 2, with an aperture 42 therein in diametrical alignment with a nipple 43 projecting from the upper surface of said deflector plate 38, said nipple and said aperture 42 being at either side of said central aperture 39. Said deflector plate 38 has a diameter greater than that of said tubular member 30 and somewhat less than that of said housing 22.

Said deflector plate 38 has an outer upwardly angled peripheral flange 46 thereabout. Adjacent said flange at one point thereof is a passage 48 extending tangentially through the wall of said deflector plate. Projecting inwardly of said deflector plate overlying said passage 48 is an air scoop 50 having a vertical wall 51 merging into the wall structure of said deflector plate and having a bottom wall 52 at right angles thereof merging into the wall of said deflector plate forming a passage 53 leading directly into said passage 48. FIGS. 4 and 5 are fragmentary views taken at the inner and outer sides of said air scoop 50 with reference to FIG. 2 further illustrating the relationship between the walls of said scoop and the passage 48.

It will be understood that said housing 12 may be formed having an integral top wall, but in the particular embodiment here illustrated, forming the upper portion of said housing is a cap member 55 comprising a cylindrical wall portion 56 having a top wall 57 with an aperture 58 therethrough to receive the upper end portion of said rod 22. Said cap member will have the bottom edge portion of its wall 56 seated on an annular peripheral flange 12a formed about the upper end portion of said housing 12. Formed on the inner surface of said top wall 57 is a recess 59 to receive said nipple 43 and a nipple 60 is formed on said surface to be received by said aperture 42. Thus said deflector plate 38 will have its central flat area portion 41 seated against said top wall 57 and will be positioned with respect thereto by the respective engagement of said nipples and the apertures corresponding therewith.

Formed in said side wall 56 is an elongated outlet passage 65 having an outwardly projecting cylindrical sleeve 67 forming a discharge passage 65a which is an extension of said passage 65. Said passage 65 will be in alignment with said passage 48 formed in said deflector plate 38.

Said deflector plate 38 and said cap member 55 will be supported on said rod 22 and will be secured in position by said lock nut 34.

The space between the outer side of said member 38 and the adjacent surface of said member 55 forms an annular passage 70.

OPERATION

In operating position said air cleaner 10 will be mounted onto the air intake of a carburetion system. This is a conventional mounting. The operation of the motor through the carburation system will cause a lowered pressure area within said passage 25 and the action herein is commonly referred to as suction. This action causes air to be drawn into the housing 12 through the annular passage 26. The incoming air will strike the louvers 27 to be deflected upwardly and this will accelerate the normal centrifugal action which takes place when air is drawn through a passage. The contaminants within the air will be centrifuged and thrown outwardly against the inner surface of the wall of said housing 30 and will thus be carried upwardly to the upper portion of the housing above the deflector plate 38 as well as against the inner surface of the deflector plate 38. The centrifugal action of the air will continue making the air directly about and adjacent the tubular member 30 substantially clear of contaminants and it is this air which is drawn into the carburetion system.

The air swirling about the inner surface of the deflector plate 38 will pass through the passage 53 of the air scoop 50 and the passage 48 forming its outlet and therefrom through the passages 65 and 65a to the atmosphere. The air continues to swirl above the deflector plate in the space between said deflector plate and said cap member 55, which space is designated as the annular passage 70. The peripheral flange 46 tends to retain any contaminants which may become deposited on the upper surface of the deflector plate 38 and the contaminants retained by said flange are carried away by the action of the air stream moving around said deflector plate and exhausting outwardly through the air scoop 50 and the passages 48, 65 and 65a.

The particular design of said deflector plate 38 lends itself to an efficient separation of and substantially complete discharge of contaminants to the atmosphere from the air stream drawn into the air cleaner. This action also avoids the accumulation of contaminants within the air cleaner or upon said deflector plate and thus maintaining said air cleaner in a self cleaning condition.

The air cleaner above described has operated very successfully in commercial use.

What is claimed is:

1. An air cleaner for the engine of a motor vehicle comprising,
    a cylindrical housing having a bottom wall and a top wall,
    said bottom wall having means defining an annular peripheral passage therethrough including vanes to impart a whirling motion to an entering air stream and having means defining a central passage therethrough,
    a tubular member upstanding from said bottom wall aligned with said means defining a central passage to form an upward extension thereof,
    an upright hollow dome-shaped deflector member spaced above the upper end of said tubular member provided with a side wall of circular cross-section,
    means supporting said deflector member in said housing,
    said deflector member having an outlet passage extending tangentially through the side wall thereof adjacent the rim portion thereof and an air scoop means defining a passage connected with said outlet passage and projecting inwardly of said deflector member,
    said deflector member having a diameter of lesser extent than the inner diameter of the wall of said housing and thus forming an annular passage between said rim portion thereof and said wall of said housing,
    said deflector member having an outwardly and upwardly projecting annular ledge about the rim portion thereof,
    said deflector member having engagement between its central wall portion thereof and said top wall of said housing, and having an annular passage formed between the remainder of its upper wall portion and said top wall,
    means securing said deflector member to said top wall, and
    the housing side wall having a tangential outlet passage adjacent said outlet passage of said deflector member.

References Cited

UNITED STATES PATENTS

| | | | |
|---|---|---|---|
| 434,216 | 8/1890 | Verrell | 55—457 |
| 1,539,797 | 5/1925 | Chandler et al. | 55—449 |
| 1,733,491 | 10/1929 | Kamrath | 55—460 |
| 1,734,030 | 11/1929 | Bennett | 55—457 |
| 1,906,432 | 5/1933 | Summers | 55—457 |
| 2,134,978 | 11/1938 | Marshall | 55—447 |

FRANK W. LUTTER, Primary Examiner

B. NOZICK, Assistant Examiner

U.S. Cl. X.R.

55—457